March 2, 1937.  C. W. CAREY  2,072,084
PHOTOGRAPHIC APPARTUS
Filed May 25, 1936

INVENTOR,
Clarence W. Carey
BY
J. E. Trabucco
ATTORNEY.

Patented Mar. 2, 1937

2,072,084

UNITED STATES PATENT OFFICE 2,072,084

PHOTOGRAPHIC APPARATUS

Clarence W. Carey, San Jose, Calif.

Application May 25, 1936, Serial No. 81,629

11 Claims. (Cl. 95—82)

This invention relates to improvements in photographic apparatus for use in photographing living or still life subjects in exact uniformity as to position, distance, background, size, exposure and tone.

An object of my invention is to provide improved photographic apparatus for use in positioning the head of a human subject in precisely the same position with respect to the camera, whereby a number of sets of photographs taken at infrequent intervals will be identical except for the growth, development and physiognomical changes naturally taking place with the lapse of time.

Another object of my invention is to provide improved photographic apparatus for making a plurality of sets of similar photographic records of the front view and profile of the head of a human subject at infrequent intervals, the said apparatus embodying novel means for maintaining the subject's head in precisely the same corresponding positions with respect to a camera, irrespective of the elapsed time between the taking of the sets of photographs.

Other and further objects of the present invention will be pointed out hereinafter, indicated in the appended claims, or obvious to one skilled in the art upon an understanding of the present disclosure. For the purposes of this application, I have elected to show herein certain forms and details of photographic apparatus representative of my invention; it is understood, however, that these are presented here for purposes of illustration only, and that therefore they are not to be regarded as exhaustive of the variations of the invention, nor are they to be given any interpretation such as might have the effect of limiting the claims, short of the true and most comprehensive scope of the invention in the art.

Figures 1, 2, 3:
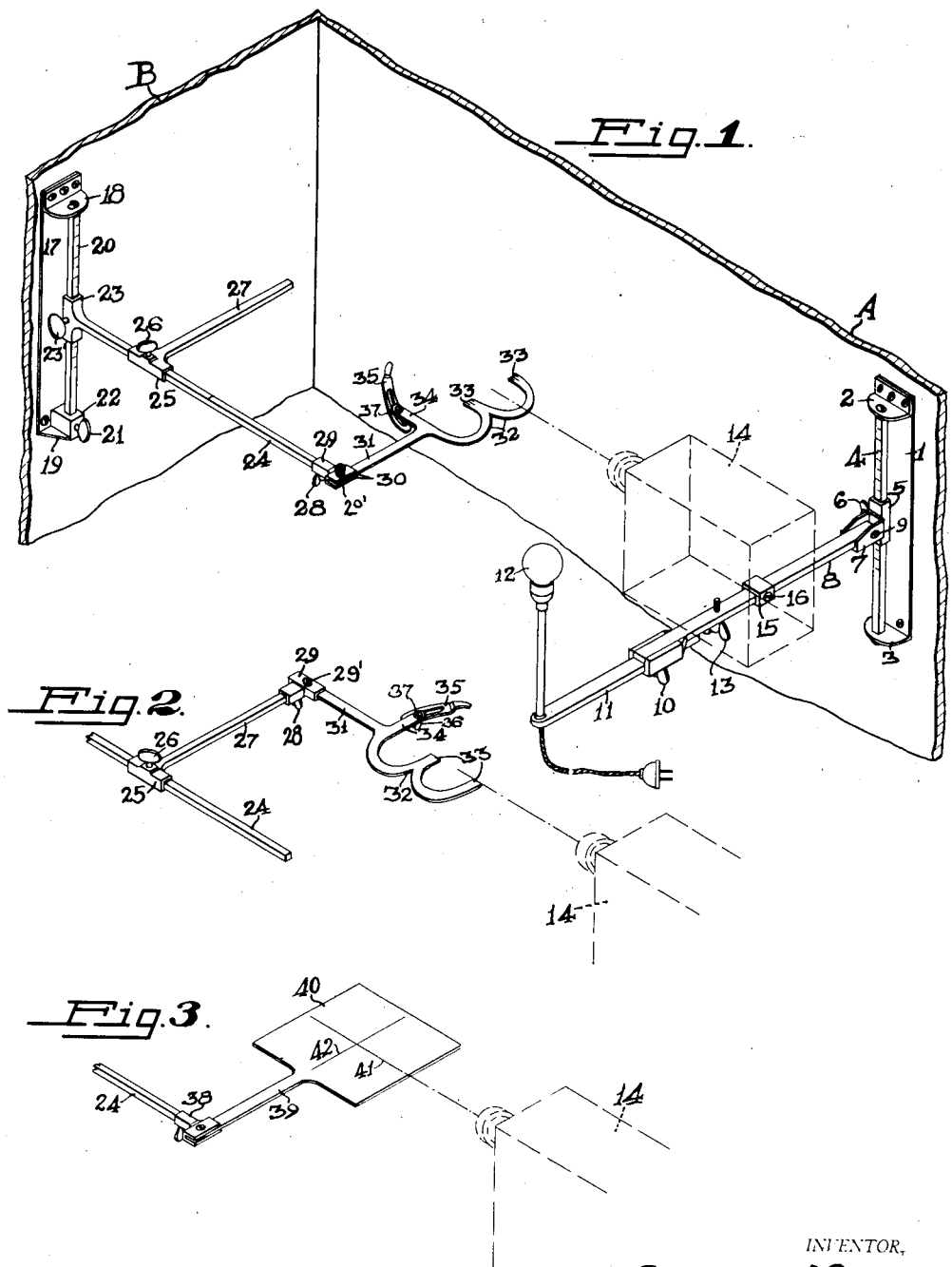
Fig. 1 is a perspective view of photographic apparatus representative of my invention, showing the same operatively applied to adjoining side walls, and positioned to take a front view of the head of the human subject.
Fig. 2 is a perspective view of a part of the apparatus, showing its position when a profile of the subject's head is to be photographed.
Fig. 3 is a perspective view of a modified structure, showing means for supporting inanimate objects of various kinds in certain positions in front of a camera.

The apparatus comprising my invention consists of a camera supporting structure mounted on one of two vertical adjoining walls positioned at an angle of approximately ninety degrees with respect to one another, and the subject positioning structure mounted on the other wall.

Referring to Fig. 1 of the drawing, the camera supporting structure comprises a suitably shaped and proportioned bracket 1, secured to a vertical wall A at a desirable height, as by screws. The bracket is provided at its upper and lower ends with outwardly disposed flanges 2 and 3 to which is suitably secured a non-rotatable vertical rod 4 having graduation marks thereon. Slidably mounted on the rod 4 is a tubular member 5 provided with a flanged or winged set screw 6 which serves to adjustably secure the said tubular member to the rod at a desired height. The rod and tubular member are square or otherwise suitably shaped so as to prevent the pivotal movement of the tubular member with respect to the rod. Formed integrally with or otherwse suitably affixed to the tubular member 5 is an outwardly disposed U-shaped member 7 having a camera supporting bar 8 pivotally secured thereto, as by a pin 9. The bar 9 is adapted to assume a vertical out-of-the-way position when not in use, but normally it rests against the lower side of the U-shaped member 7 and is supported thereby in a horizontal position. To the outwardly disposed end of the bar 8 is removably secured, as by a winged set screw 10, an electric globe supporting fixture 11 which is suitably wired and provided with a globe 12. Threaded onto the outwardly disposed end portion of the bar 8 at a predetermined point thereon is a winged screw 13 which extends through the bar and is adapted to screw into the base of a camera 14 to hold the latter in a fixed position on the said bar. Slidably extending around the bar 8 is a rectangular shaped ring 15 having a set screw 16 which permits its being secured to the bar in a position against the side of the camera, thereby maintaining the latter in a position where the axis of its lens is at right angles to both the horizontal bar and to the vertical rod 4.

The subject positioning structure comprises a suitably shaped and proportioned bracket 17, positioned at the same height as the bracket 1, and secured as by screws to a vertical adjoining side wall B which is disposed at right angles to the wall A. The bracket 17 is provided at its upper and lower ends with outwardly disposed flanges 18 and 19 to which is pivotally secured a vertical rod 20 having graduation marks thereon. The rod is normally held in a fixed position by a winged set screw 21 threaded into a tubular member 22 formed at the upper side of the flange 19, the said tubular member being adapted to receive the lower rounded end of the rod. The inwardly disposed end of the set screw 21 enters a groove provided at a predetermined point in the lower rounded end of the rod 20, thereby securing the said bar in a normally fixed position when the said set screw is screwed inwardly into the said groove and against the bar. Slidably mounted on the rod 20 is a tubular member 23 provided with a winged set screw 23' which serves to adjustably secure the said tubular member to the rod at any desired height. The rod and tubular member are square or otherwise suitably shaped so as to prevent the pivotal movement of the tubular member with respect to the rod. Formed integrally with or otherwise suitably affixed to the tubular member 23 is an outwardly disposed horizontal rod 24 of predetermined length which is normally positioned parallel to the axis of the camera's lens. The set screw 21, when screwed into the groove at the lower end of the rod 20, maintains the latter in a position whereby the rod 24 is held in the position aforesaid. When the said set screw 21 is withdrawn from the groove in the rod 20, the latter is free to pivotally move so the rod 24 and its attachments may be moved to an out-of-the-way position against the wall B.

Slidably mounted on the rod 24 is a non-rotatable tubular member 25 having a winged set screw 26 threaded therein which serves to adjustably secure the same to the rod 24. The tubular member 25 is formed integrally with or otherwise suitably secured to a horizontal positioning rod 27 which is positioned at right angles to the rod 24.

Mounted on the outwardly disposed end of the rod 24 and rigidly but removably secured thereto by a winged set screw 28, is a tubular member 29 having a forked end 30. Pivotally secured, as by a pin 29', to the forked end 30 of the tubular member 29 is a horizontal bar 31 having a thin double U-shaped member 32 formed integrally therewith. The double U-shaped member 32 is also horizontally disposed and is provided with two rearwardly protruding arms 33, the extremities of which are provided with suitable calibration marks, and are positioned in a vertical plane disposed at right angles to the axis of the camera lens. The end of the bar 31 is also provided with a rearwardly disposed arm 34 which has a slotted and curved ear pointer 35 of suitable length adjustably secured thereto, as by a wing nut 36 and a screw 37.

The camera supporting structure is attached to the wall A at a distance of from four to six feet from the adjoining wall B, with the horizontal bar 8 positioned about forty-two inches above the floor. The various parts of the apparatus are so positioned that the axis of the camera lens if projected forwardly in a straight line will pass centrally through and bisect the outer curved part of the double U-shaped member 32, when the latter is in a horizontal position with its supporting bar 31 disposed at an angle of ninety degrees with respect to the said camera lens axis. When the apparatus is in a set up position, the axis of the camera lens should be in the same horizontal plane as the double U-shaped member 32, with the upper end of the tubular member 5 of the camera supporting structure positioned at a particular graduation mark on the rod 4 which corresponds to the particular graduation mark on the rod 20 where the upper end of the tubular member 23 is positioned. The apparatus may be used in the left hand corner of a room instead of in the right hand corner by reversing the positions of certain parts of the apparatus.

In taking a front view picture of a person's head, the subject is seated or otherwise suitably placed behind the double U-shaped member 32, facing the camera, with a suitable head rest preferably provided on the chair upon which the subject is seated positioned behind the latter's head. After the double U-shaped member 32 has been adjusted to a proper height by adjusting the position of the tubular member 23 on the vertical rod 20, the camera is correspondingly raised or lowered by securing the tubular member 5 to the rod 4 at a particular calibration mark corresponding to that on the rod 20 at which the tubular member 23 is secured. The subject's head is then moved forwardly until the two central calibration marks on the rearwardly protruding arms 33 are positioned directly in front of the two infraorbital bones located directly beneath the pupils of the eyes. The proper positioning of the subject's head with respect to the double U-shaped member 32 is facilitated by first marking by means of a pencil on the skin's surface the two points where the two infraorbital bones are located. The ear pointer 35 is then turned until its tapered end lies next to the upper margin of the tragus of the ear. When the three points of the head positioning part of the apparatus are in contact with the subject's head as above described, the rod 27 or the chair's head rest is brought into engagement with the back of the subject's head to stabilize or support it while the photograph is being taken. The camera 14 having been previously adjusted as to focus and position is then capable of being operated in the usual manner to make an exposure. After thus positioning the subject's head as aforesaid, the set screw 21 is withdrawn to permit the turning of the vertical rod 20 and the subsequent swinging of the head positioning part of the apparatus out of the way in order that an unobstructed picture can be taken. A suitable background is ordinarily positioned on the wall B and adequate lights are provided to properly illuminate the subject's head. The exposure is then made in the usual way by manipulating the camera's shutter operating mechanism, and this is done at a time when the electrical circuit to the globe 12 and other needed lights is closed.

When making a profile record the subject's position is changed so his back is opposite the wall A. The tubular member 29 is then removed from the bar 24 and secured to the end of the rod 27 (Fig. 2), after which the bar 31 is swung forwardly as far as it will go, thereby positioning the said bar parallel to the rod 24 and thus bringing the extreme ends of the arms 33 in line with the axis of the camera lens. The set screw 28 is then tightened to maintain the double U-shaped member 32 in a stationary position. The subject's head is positioned as before with respect to the double U-shaped member 32, and after the latter is swung out of the way as above explained, the exposure is again made. The apparatus is so designed that the focal point of the camera lens for the front view is a point midway between the two marks on the face indicating the position of the two infraorbital bonds, while the focal point for the profile is the facial mark closest the camera, thereby permitting both views to be photographed without refocusing or adjusting the camera.

In order to photograph an inanimate object, such as a dental plate, I have provided apparatus such as that illustrated in Fig. 3, wherein a nonrotatable tubular member 38 is secured by a set screw to the rod 24 near the end thereof. The tubular member is formed integrally with or pivotally attached to a horizontally disposed bar 39 which is positioned at right angles to the rod 24. At the end of the bar 39 is a flat horizontal support 40 which has two intersecting lines 41 and 42 thereon that lie at right angles to one another, the former being aligned with the axis of the camera lens. The purpose of the horizontal support with its intersecting lines is to provide means for photographically recording objects so that uniformity as to size, position and exposure can be obtained. The various rods and bars together with the tubular members mounted on them are preferably square in cross section, thereby preventing pivotal movement of the tubular members with respect to their associated rods or bars, or vice versa.

Having described my invention, what I claim is:

1. Photographic apparatus of the kind described comprising a pair of vertical brackets mounted at predetermined points on adjoining side walls; a horizontal camera support adjustably mounted on one of the brackets; a camera mounted on the support; an adjustable horizontal rod mounted on the other bracket, the said rod being capable of vertical adjustment and positioned in a horizontal plane which is parallel to the axis of the camera's lens; a head positioning horizontal bar secured to and extending at right angles to the adjustable rod; a U-shaped horizontal member secured to the bar in a position whereby a straight line passing through the axis of the camera's lens bisects the U-shaped member; and an adjustable member on the bar for engaging with a certain point on the head of the subject to be photographed.

2. Photographic apparatus of the kind described comprising a horizontal camera support; means for adjusting the vertical position of the support; a camera mounted on the support; a horizontal supporting member for head positioning apparatus; means for adjusting the vertical position of the supporting member; a bar secured to the supporting member and positioned in a horizontal plane and disposed at an angle of ninety degrees with respect to the axis of the lens of the camera; a curved horizontal member secured to the bar and positioned in front of the camera, having two rearwardly disposed protuberances which constitute the extremities of the curved member, the curved member being positioned in line with the axis of the camera lens, and the two protuberances being adapted to engage with a subject's face where the infraorbital bones are located; and an adjustable arm mounted on the bar and adapted to engage with the subject's head at a certain point thereon.

3. Photographic apparatus of the kind described comprising an upright supporting bracket; a horizontal camera support adjustably mounted on the bracket; a camera mounted on the support in a position whereby its lens is positioned with its axis lying in a horizontal plane; a second bracket positioned at approximately the same height as the first mentioned bracket and spaced at a suitable distance therefrom; a horizontal rod adjustably supported by the second bracket, the said rod being positioned in the same horizontal plane and parallel to the axis of the camera lens, but not in line therewith; and a curved head positioning member located in front of the camera and extending from the rod and lying in the same horizontal plane that the rod and the axis of the camera lens are positioned in, the said curved head positioning member having two spaced and rearwardly disposed protuberances, the rear extremities of which are both in a vertical plane which lies at right angles to the axis of the camera lens, the extremities of the protuberances being adapted to engage with the human subject's face which is to be photographed at points where his two infraorbital bones are located, the said curved head positioning member being so positioned with respect to the camera that a straight line projected forwardly from the axis of the camera lens will pass midway between the two spaced protuberances.

4. Photographic apparatus of the kind described comprising a bracket supported on one of two adjoining vertical walls which are positioned at right angles to one another; a horizontal camera support adjustably mounted on the bracket; a camera mounted on the support in a position whereby the axis of its lens is in a horizontal plane; a second bracket secured to the other adjoining wall and positioned at approximately the same height as the first mentioned bracket; a horizontal rod adjustably supported by the second mentioned bracket; a curved head positioning member lying in the same horizontal plane as the axis of the camera lens and positioned directly in front of the said camera lens, the said curved member having two rearwardly disposed and spaced protuberances which terminate at points lying in a vertical plane which is at right angles to the axis of the camera lens, the said protuberances being so positioned that the axis of the camera lens if projected forwardly will pass midway between them; and an adjustable ear pointer mounted on the head positioning member.

5. Photographic apparatus of the kind described comprising an upright supporting bracket; a horizontal camera support adjustably mounted on the bracket; a camera mounted on the support in a position whereby its lens is disposed with its axis lying in a horizontal plane; a second bracket positioned at approximately the same height as the first mentioned bracket and spaced at a suitable distance therefrom; a horizontal rod adjustably supported by the second mentioned bracket, the said rod being positioned in the same horizontal plane and parallel to the axis of the camera lens but not in line therewith; a head positioning member supported in front of the camera by the rod and lying in the same horizontal plane that the axis of the camera lens and the rod are positioned in, the said head positioning member having two spaced and rearwardly disposed extensions, the rear extremities of which are both positioned in a common vertical plane disposed at right angles to the axis of the camera lens, the said extremities of the protuberances being adapted to engage with a person's face which is to be photographed at predetermined points at the opposite side of and at equal distances from the bridge of his nose, the said head positioning member being so positioned with respect to the camera that the forward extension of the axis of the camera lens will pass midway between the rear extremities of the two spaced extensions, and an ear pointer adjustably supported by the head positioning member.

6. In photographic apparatus of the kind described, an upright wall bracket having vertically aligned flanges thereon; a graduated vertical rod mounted on and positioned between the flanges; a tubular member mounted for vertical adjustment on the vertical rod; a camera support pivoted to the tubular member; the said tubular member having means for normally maintaining the camera support in a horizontal position; an electric globe supporting fixture mounted on the camera support; and a camera mounted on the camera support.

7. In photographic apparatus of the kind described, a wall bracket having outwardly disposed vertically aligned flanges, a vertical rod secured to the flanges, a camera support adjustably mounted on the vertical rod, and a camera mounted on the support.

8. In photographic apparatus of the kind described; a wall bracket having outwardly disposed vertically aligned flanges; a vertical rod pivotally mounted on the flanges, means for normally preventing the pivotal movement of the rod; and head positioning apparatus adjustably supported by the rod.

9. In photographic apparatus of the kind described; a wall bracket having outwardly disposed vertically aligned flanges; a vertical graduated rod pivotally mounted on the flanges, means for normally preventing the pivotal movement of the rod; a horizontal supporting member adjustably mounted on the rod, and means supported by the supporting member for positioning a person's head in a certain predetermined position.

10. In photographic apparatus of the kind described; a wall bracket; a vertical rod supported on the bracket; a horizontal rod mounted for vertical adjustment on the vertical rod; a horizontal bar secured to the horizontal rod and disposed at right angles thereto; and a head positioning member provided at the end of the bar, the said head positioning member having spaced and aligned extensions which are in a common horizontal plane.

11. In photographic apparatus of the kind described; a wall bracket; a vertical graduated rod mounted on the bracket; a tubular member mounted for vertical adjustment on the rod; a horizontal extension secured to the tubular member; a horizontal rod secured to the extension and disposed at right angles thereto; a horizontal bar also secured to the extension and positioned parallel to the rod; a double U-shaped head positioning member formed at the end of the bar, having spaced and aligned protuberances thereon which are disposed in a common horizontal plane, the said protuberances being adapted to serve as guides for positioning the head of a person to be photographed in a certain position, and an ear pointer adjustably mounted on the rod.

CLARENCE W. CAREY.